US006984470B2

(12) United States Patent
Morishima et al.

(10) Patent No.: US 6,984,470 B2
(45) Date of Patent: Jan. 10, 2006

(54) POSITIVE ELECTRODE ACTIVE MATERIAL AND NONAQUEOUS ELECTROLYTE SECONDARY BATTERY

(75) Inventors: Hideaki Morishima, Chiba-ken (JP); Shuji Yamada, Kanagawa-ken (JP); Hideyuki Kanai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 10/102,705

(22) Filed: Mar. 22, 2002

(65) Prior Publication Data

US 2003/0054253 A1 Mar. 20, 2003

(30) Foreign Application Priority Data

Mar. 26, 2001 (JP) ............................. 2001-087038

(51) Int. Cl.
*H01M 4/58* (2006.01)

(52) U.S. Cl. ............................ 429/231.95; 429/231.6; 429/223; 252/182.1; 252/521.6

(58) Field of Classification Search ........... 429/231.95, 429/223, 224, 220, 231.6, 231.5, 221, 94, 429/162, 300, 163, 176, 185, 186, 127, 131; 423/306; 428/72, 212, 343, 542.8
See application file for complete search history.

(56) References Cited

U.S. PATENT DOCUMENTS 6,632,566 B1 * 10/2003 Yamada et al. .......... 429/218.1
2002/0150816 A1 * 10/2002 Sakai et al. .................... 429/94
2003/0170542 A1 * 9/2003 Barker et al. ............ 429/231.9
2004/0265695 A1 * 12/2004 Barker et al. ............ 429/231.9

FOREIGN PATENT DOCUMENTS

JP 09-134724 * 5/1997

OTHER PUBLICATIONS

K. Amine, et al., "Ollvine LICoPO $_4$ 4.8 V Electrode Material for Lithium Batteries", Electrochemical and Solid-State Letters, 2000, pp. 178-179, no month available.
Pending U.S. Appl. No. 10/050, 926 filed Jan. 22, 2002.

* cited by examiner

*Primary Examiner*—Raymond Alejandro
(74) *Attorney, Agent, or Firm*—Oblon, Spivak, McClelland, Maier & Neustadt, P.C.

(57) ABSTRACT

A positive electrode active material and a nonaqueous electrolyte secondary battery containing a lithium-containing composite metal oxide having a composition represented by: $Li_{1+y}M_{1-y-z}M1_zPO_4$ where M is at least one of Co and Ni, and M1 is at least one of Mg, Zr and Al, the molar ratio y is larger than 0 and smaller than 0.5, and the molar ratio z is larger than 0 and not larger than 0.5 is provided.

20 Claims, 1 Drawing Sheet

POSITIVE ELECTRODE ACTIVE MATERIAL AND NONAQUEOUS ELECTROLYTE SECONDARY BATTERY

CROSS-REFERENCE TO RELATED APPLICATIONS

This application is based upon and claims the benefit of priority from the prior Japanese Patent Application No. 2001-087038, filed Mar. 26, 2001, the entire contents of which are incorporated herein by reference.

BACKGROUND OF THE INVENTION

1. Field of the Invention

The present invention relates to a positive electrode active material and to a nonaqueous electrolyte secondary battery equipped with a positive electrode containing the positive electrode active material.

2. Description of the Related Art

In recent years, a portable information terminal has been developed and being propagated rapidly. With propagation of the portable information terminal, a research and development of a nonaqueous electrolyte secondary battery used as a power source of the portable information terminal is being carried out vigorously so as to put the secondary battery to the practical use. Known is a lithium ion secondary battery, which is an example of the nonaqueous electrolyte secondary battery, comprising a positive electrode, a negative electrode, a separator arranged between the positive electrode and the negative electrode, and a liquid nonaqueous electrolyte impregnated in the separator. The lithium ion secondary battery, which has been put to the practical use, has a discharge voltage of about 4V.

On the other hand, the development of a nonaqueous electrolyte secondary battery exhibiting a discharge voltage higher than 4V has already been started. A nonaqueous electrolyte secondary battery comprising $LiCoPO_4$ or $LiNiPO_4$ as the positive electrode active material is known to exhibit a high discharge voltage of about 5V.

The theoretical discharge capacity, which is obtained when a lithium ion is inserted into and extracted from the active material, is about 170 mAh/g in each of $LiCoPO_4$ and $LiNiPO_4$. However, the discharge capacity that is actually obtained is about half the theoretical discharge capacity noted above. In addition, each of $LiCoPO_4$ and $LiNiPO_4$ is defective in that the diffusion rate of the lithium ions within the crystal is low, with the result that, if the charge-discharge is carried out with a high current density, it is impossible to obtain a large discharge capacity.

BRIEF SUMMARY OF THE INVENTION

An object of the present invention is to provide a positive electrode active material capable of obtaining a large discharge capacity and a good discharge rate characteristics, and a nonaqueous electrolyte secondary battery comprising a positive electrode containing the particular positive electrode active material.

According to a first aspect of the present invention, there is provided a nonaqueous electrolyte secondary battery, comprising:

a positive electrode containing a positive electrode active material containing a lithium-containing composite metal oxide;

a negative electrode; and a nonaqueous electrolyte;

wherein the lithium-containing composite metal oxide has a composition represented by formula (1) given below:

$$LiMg_xM_{1-x}PO_4 \qquad (1)$$

where M is at least one kind of an element selected from the group consisting of Co and Ni, and the molar ratio x is larger than 0.5 and smaller than 0.75, i.e., $0.5<x<0.75$.

According to a second aspect of the present invention, there is provided a nonaqueous electrolyte secondary battery, comprising:

a positive electrode containing a positive electrode active material containing a lithium-containing composite metal oxide;

a negative electrode; and a nonaqueous electrolyte;

wherein the lithium-containing composite metal oxide has a composition represented by formula (2) given below:

$$Li_{1+y}M_{1-y-z}\mathbf{M1}_zPO_4 \qquad (2)$$

where M is at least one kind of an element selected from the group consisting of Co and Ni, M1 is at least one kind of an element selected from the group consisting of Mg, Ti, V, Cr, Mn, Fe, Cu, Zr and Al, the molar ratio y is larger than 0 and smaller than 0.5, i.e., $0<y<0.5$, and the molar ratio z is larger than 0 and not larger than 0.5, i.e., $0<z\leqq 0.5$.

According to a third aspect of the present invention, there is provided a nonaqueous electrolyte secondary battery, comprising:

a positive electrode containing a positive electrode active material containing a lithium-containing composite metal oxide;

a negative electrode; and a nonaqueous electrolyte;

wherein the lithium-containing composite metal oxide has a composition represented by formula (3) given below:

$$LiM_v\mathbf{M2}_w\mathbf{M3}_sP_tO_4 \qquad (3)$$

where M is at least one kind of an element selected from the group consisting of Co and Ni, M2 is at least one kind of an element selected from the group consisting of Mg, V, Cr, Mn, Fe, Cu and Zr, M3 is at least one kind of an element selected from the group consisting of Al, Si and Ti, the molar ratio w is larger than 0 and not larger than 0.3, i.e., $0<w\leqq 0.3$, the molar ratio s is larger than 0 and smaller than 0.3, i.e., $0<s<0.3$, the molar ratio t is not smaller than 1−s and smaller than 1, i.e., $1-s\leqq t<1$, and the sum of v, w, s and t is 2, i.e., $v+w+s+t=2$.

According to a fourth aspect of the present invention, there is provided a positive electrode active material containing a lithium-containing composite metal oxide having a composition represented by formula (1) given below:

$$LiMg_xM_{1-x}PO_4 \qquad (1)$$

where M is at least one kind of an element selected from the group consisting of Co and Ni, and the molar ratio x is larger than 0.5 and smaller than 0.75, i.e., $0.5<x<0.75$.

According to a fifth aspect of the present invention, there is provided a positive electrode active material containing a lithium-containing composite metal oxide having a composition represented by formula (2) given below:

$$Li_{1+y}M_{1-y-z}\mathbf{M1}_zPO_4 \qquad (2)$$

where M is at least one kind of an element selected from the group consisting of Co and Ni, M1 is at least one kind of an element selected from the group consisting of Mg, Ti, V, Cr, Mn, Fe, Cu, Zr and Al, the molar ratio y is larger than 0 and smaller than 0.5, i.e., $0<y<0.5$, and the molar ratio z is larger than 0 and not larger than 0.5, i.e., $0<z\leqq 0.5$.

According to a sixth aspect of the present invention, there is provided a positive electrode active material containing a lithium-containing composite metal oxide having a composition represented by formula (3) given below:

$$LiM_vM2_wM3_sP_tO_4 \quad (3)$$

where M is at least one kind of an element selected from the group consisting of Co and Ni, M2 is at least one kind of an element selected from the group consisting of Mg, V, Cr, Mn, Fe, Cu and Zr, M3 is at least one kind of an element selected from the group consisting of Al, Si and Ti, the molar ratio w is larger than 0 and not larger than 0.3, i.e., $0<w\leqq 0.3$, the molar ratio s is larger than 0 and smaller than 0.3, i.e., $0<s<0.3$, the molar ratio t is not smaller than 1−s and smaller than 1, i.e., $1-s\leqq t<1$, and the sum of v, w, s and t is 2, i.e., $v+w+s+t=2$.

DETAILED DESCRIPTION OF THE INVENTION

Figure 1:
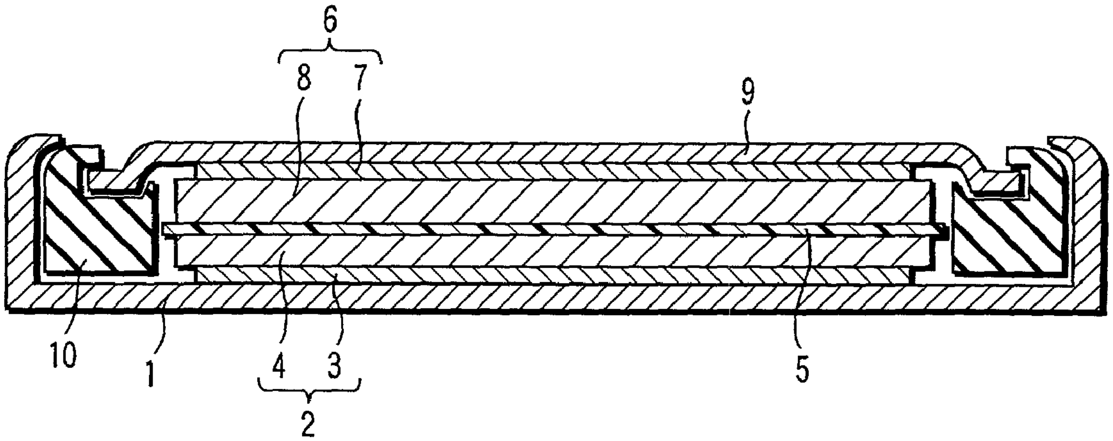
FIG. 1 is a cross sectional view showing a button type nonaqueous electrolyte secondary battery as an example of a nonaqueous electrolyte secondary battery of the present invention.

The first to third positive electrode active materials of the present invention will now be described.

<First Positive Electrode Active Material>

The first electrode active material contains a lithium-containing composite metal oxide having a composition represented by formula (1) given below:

$$LiMg_xM_{1-x}PO_4 \quad (1)$$

where M is at least one kind of an element selected from the group consisting of Co and Ni, and the molar ratio x is larger than 0.5 and smaller than 0.75, i.e., $0.5<x<0.75$.

(Element M)

The transition metal element M is absolutely necessary for bringing about a lithium absorption-desorption reaction. In order to obtain a high operating voltage in the nonaqueous electrolyte secondary battery, it is desirable for at least one of Ni and Co to be used as the element M.

(Mg)

In the present invention, the molar ratio x of Mg is defined to be larger than 0.5 and smaller than 0.75. If the molar ratio x is 0.5 or less, the lithium diffusion rate within the positive electrode active material is lowered, with the result that it is difficult to obtain a large discharge capacity when the secondary battery is discharged with a large current. In other words, the discharge rate characteristics are lowered. On the other hand, if the molar ratio x is 0.75 or more, the discharge capacity of the nonaqueous secondary battery is lowered. It is more desirable for the molar ratio x to be not smaller than 0.52 and to be smaller than 0.75, and furthermore desirably to be not smaller than 0.54 and to be smaller than 0.75.

<Second Positive Electrode Active Material>

The second electrode active material contains a lithium-containing composite metal oxide having a composition represented by formula (2) given below:

$$Li_{1+y}M_{1-y-z}M1_zPO_4 \quad (2)$$

where M is at least one kind of an element selected from the group consisting of Co and Ni, M1 is at least one kind of an element selected from the group consisting of Mg, Ti, V, Cr, Mn, Fe, Cu, Zr and Al, the molar ratio y is larger than 0 and smaller than 0.5, i.e., $0<y<0.5$, and the molar ratio z is larger than 0 and not larger than 0.5, i.e., $0<z\leqq 0.5$.

(Li)

If the molar ratio of lithium is larger than 1, it is possible to improve the lithium diffusion rate within the positive electrode active material. It is considered reasonable to understand that the decrease in the bonding strength between $PO_4^{3-}$ and $Li^+$ contributes to the improvement in the lithium diffusion rate within the positive electrode active material. However, if the molar ratio of lithium is not smaller than 1.3, the probability for the excessive lithium ions to impair the diffusion of the lithium ions is increased, with the result that it is possible for the lithium diffusion rate within the positive electrode active material to be lowered. It follows that the molar ratio y should be larger than 0 and not larger than 0.3. It is more desirable for the molar ratio y to fall within a range of between 0.02 and 0.2, furthermore desirably between 0.04 and 0.1.

(Element M)

The transition metal element M is directly involved in the absorption-desorption of lithium. In order to obtain a high operating voltage in the nonaqueous electrolyte secondary battery, it is desirable for at least one of Ni and Co to be used as the element M.

(Element M1)

The molar ratio z of the element M1 is defined to be larger than 0 and to be not larger than 0.5. It should be noted that the element M1 serves to improve the lithium diffusion rate within the positive electrode active material. If the element M1 is not added, it is difficult to improve the lithium diffusion rate within the positive electrode active material so as to make it difficult to improve the discharge rate characteristics. However, if the molar ratio z exceeds 0.5, the amount of the transition metal element M contained in the complex metal oxide is decreased so as to decrease the discharge capacity of the nonaqueous electrolyte secondary battery. Under the circumstances, the molar ratio z should be larger than 0 and should not exceed 0.5. In this case, it is possible to make excellent both the discharge capacity and the discharge rate characteristics of the nonaqueous electrolyte secondary battery. It is more desirable for the molar ratio z to fall within a range of between 0.02 and 0.3, furthermore desirably between 0.04 and 0.2.

It is desirable to use Mg, Ti, Fe and Al as the element M1, and it is more desirable to use Mg and Al as the element M1.

Mg is easy to form a solid solution within the mother phase of $LiMPO_4$ and, thus, permits shortening the baking time, compared with the case of using another element as the element M1, so as to simplify the synthesis of the positive electrode active material.

On the other hand, Al, which has a lower atomic weight compared with each of Ti and Fe, permits making the weight increase of the positive electrode active material relatively small so as to increase the weight energy density of the positive electrode active material.

<Third Positive Electrode Active Material>

The third electrode active material contains a lithium-containing composite metal oxide having a composition represented by formula (3) given below:

$$LiM_vM2_wM3_sP_tO_4 \quad (3)$$

where M is at least one kind of an element selected from the group consisting of Co and Ni, M2 is at least one kind of an element selected from the group consisting of Mg, V, Cr, Mn, Fe, Cu and Zr, M3 is at least one kind of an element selected from the group consisting of Al, Si and Ti, the molar ratio w is larger than 0 and not larger than 0.3, i.e., $0<w\leqq 0.3$, the molar ratio s is larger than 0 and smaller than 0.3, i.e., $0<s<0.3$, the molar ratio t is not smaller than 1−s and smaller than 1, i.e., $1-s\leqq t<1$, and the sum of v, w, s and t is 2, i.e., $v+w+s+t=2$.

(Element M)

The element M is the basic element indispensable for the absorption-desorption reaction of lithium. In order to obtain a high operating voltage in the nonaqueous electrolyte secondary battery, it is desirable to use at least one of Ni and Co as the element M.

(Element M2)

The element M2 permits increasing the lithium diffusion rate within the positive electrode active material. The element M2 substitutes for, mainly, the element M. It is considered reasonable to understand that, since the element M2 substitutes for the element M, the bonding strength between $PO_4^{3-}$ and $Li^{30}$ is lowered so as to improve the lithium diffusion rate. If the element M2 is not added, it is difficult to improve the lithium diffusion rate within the positive electrode active material so as to make it difficult to improve the discharge rate characteristics of the nonaqueous electrolyte secondary battery. However, if the molar ratio w of the element M2 is larger than 0.3, the amount of the transition metal element M within the complex metal oxide is rendered insufficient, with the result that it is difficult to obtain a large discharge capacity in the nonaqueous electrolyte secondary battery. It follows that the molar ratio w of the element M2 should be larger than 0 and not larger than 0.3. In this case, it is possible to improve the discharge rate characteristics and the discharge capacity of the nonaqueous electrolyte secondary battery. It is more desirable for the molar ratio w of the element M2 to fall within a range of between 0.02 and 0.3, more desirably between 0.04 and 0.2.

(Element M3)

The element M3 permits increasing the lithium diffusion rate within the positive electrode active material. Since the element M3 substitutes for both the element M and phosphorus P, it is considered reasonable to understand that the decrease in the bonding strength between $PO_4^{3-}$ and $Li^+$ contributes mainly to the improvement of the lithium diffusion rate. If the element M3 is not added, it is difficult to improve the lithium diffusion rate within the positive electrode active material so as to make it difficult to improve the discharge rate characteristics of the nonaqueous electrolyte secondary battery. However, if the molar ratio s of the element M3 is 0.3 or more, the amount of the transition metal element M or phosphorus P is rendered insufficient, resulting in failure to obtain a large discharge capacity in the nonaqueous electrolyte secondary battery. It follows that the molar ratio s of the element M3 should be larger than 0 and smaller than 0.3. In this case, it is possible to improve the discharge rate characteristics and the discharge capacity of the nonaqueous electrolyte secondary battery. It is more desirable for the molar ratio s of the element M3 to fall within a range of between 0.02 and 0.1, furthermore desirably between 0.02 and 0.08.

It is desirable to use Mg or Fe as the element M2, and it is desirable to use Ti or Al as the element M3. Also, a desirable combination of the element M2 and the element M3 is the combination of Mg and Al.

(Phosphorus P)

If the element M3 is added to the basic composition of $LiMPO_4$, the element M3 can substitute for the element M or phosphorus P. Where the element M3 substitutes for phosphorus P alone, the molar ratio t of phosphorus P is rendered equal to (1−s). Also, where the element M3 is substituted for both the element M and phosphorus P, the molar ratio t of phosphorus P is rendered larger than (1−s).

If the molar ratio t of phosphorus P is not smaller than (1−s) and smaller than 1, it is possible to obtain a sufficient effect produced by the addition of the element M3 so as to make it possible to improve the discharge capacity and the discharge rate characteristics of the nonaqueous electrolyte secondary battery.

The first to third positive electrode active materials of the present invention described above can be prepared as follows. In the first step, prepared as the raw materials are an oxide containing Li, an oxide containing the element M, an oxide containing P, and an oxide containing the additive element. An optional element selected from Mg, the element M1, the element M2 and the element M3 contained in the composite metal oxides represented by formulas (1) to (3) given previously is used as the additive element. Predetermined amounts of these raw material oxides are mixed, and the resultant mixture is calcined under the air atmosphere, under the inert gas atmosphere, under the oxidizing atmosphere or under the reducing atmosphere so as to obtain the first to third positive electrode active materials.

The first positive electrode active material of the present invention described above contains the lithium-containing composite metal oxide having a composition represented by formula (1) given previously.

According to the first positive electrode active material of the present invention, the molar ratio x of Mg is larger than 0.5 and smaller than 0.75 so as to improve the diffusion rate of lithium. It follows that the nonaqueous electrolyte secondary battery comprising a positive electrode containing the first positive electrode active material of the present invention makes it possible to suppress the decrease of the discharge capacity when the secondary battery is discharged with a large current. In other words, it is possible to improve the discharge rate characteristics.

The second positive electrode active material of the present invention described above contains the lithium-containing composite metal oxide having a composition represented by formula (2) given previously.

According to the second positive electrode active material of the present invention, the element M1 and the excessively large amount of lithium make it possible to improve the lithium diffusion rate within the positive electrode active material. Therefore, compared with the case where the lithium diffusion rate is improved by the addition of the element M1 alone, it is possible to decrease the addition amount of the element M1 required for improving the lithium diffusion rate so as to make it possible to ensure sufficiently the amount of the transition metal element M involved in the charge-discharge reaction. As a result, it is possible to improve the discharge rate characteristics without impairing the discharge capacity of the nonaqueous electrolyte secondary battery.

The third positive electrode active material of the present invention described above contains the lithium-containing composite metal oxide having a composition represented by formula (3) given previously.

According to the third positive electrode active material of the present invention, the element M2 and the element M3 collectively serve to improve the lithium diffusion rate within the positive electrode active material. Although the element M2 substitutes for the transition metal element M, the element M3 substitutes for both the transition metal element M and phosphorus P, with the result that it is possible to suppress the amount of the transition metal element M decreased by the substitution by the foreign element to the minimum level so as to ensure sufficiently the amount of the transition metal element M involved in the charge-discharge reaction. It follows that it is possible to improve the discharge rate characteristics without impairing the discharge capacity of the nonaqueous electrolyte secondary battery. What should also be noted is that the nonaqueous electrolyte secondary battery comprising a positive electrode containing the third positive electrode active material of the present invention makes it possible to improve the charge-discharge cycle life.

The nonaqueous electrolyte secondary battery of the present invention will now be described.

The nonaqueous electrolyte secondary battery of the present invention comprises a case, a positive electrode provided in the case and containing at least one kind of the first to third positive electrode active materials of the present invention, a negative electrode provided in the case, and a nonaqueous electrolyte provided in the case.

The positive electrode, the negative electrode, the nonaqueous electrolyte, and the case included in the nonaqueous electrolyte secondary battery of the present invention will now be described.

1) Positive Electrode

The positive electrode comprises a positive electrode current collector and a positive electrode layer supported on one surface or both surfaces of the positive electrode current collector.

The positive electrode layer contains at least one kind of the first to third positive electrode active materials of the present invention described previously and a binder.

The materials used as the binder contained in the positive electrode layer include, for example, polytetrafluoroethylene (PTFE), polyvinylidene fluoride (PVdF), ethylene-propylene-diene copolymer (EPDM), and styrene-butadiene rubber (SBR).

It is possible for the positive electrode layer to contain further an electrical conduction assistant. The electrical conduction assistant used in the present invention includes, for example, acetylene black, carbon black and graphite.

Concerning the mixing ratio of the positive electrode active material, the electrical conduction assistant and the binder, it is desirable for the positive electrode active material to be contained in an amount of 80 to 95% by weight, for the electrical conduction assistant to be contained in an amount of 3 to 20% by weight, and for the binder to be contained in an amount of 2 to 7% by weight.

It is possible to use a conductive substrate of a porous structure or a conductive substrate of a nonporous structure as the positive electrode current collector. The material used for forming the current collector includes, for example, aluminum, stainless steel and nickel.

The positive electrode can be prepared by, for example, method (a) or method (b) given below:

(a) A positive electrode active material, an electrical conduction assistant and a binder are mixed, and the resultant mixture is bonded to a current collector by press so as obtain the positive electrode.

(b) A positive electrode active material, an electrical conduction assistant and a binder are suspended in a suitable solvent, and a current collector is coated with the resultant suspension, followed by drying and pressing the coated current collector so as to obtain the positive electrode.

2) Negative Electrode

The negative electrode contains a material capable of absorbing (doping)-releasing (desorbing) lithium.

The particular material contained in the negative electrode includes, for example, lithium metal, a Li-containing alloy capable absorbing-releasing lithium, a metal oxide capable of absorbing-releasing lithium, a metal sulfide capable absorbing-releasing lithium, a metal nitride capable of absorbing-releasing lithium, a chalcogen compound capable of absorbing-releasing lithium, and a carbonaceous material capable of absorbing-releasing lithium ions. Particularly, it is desirable for the negative electrode to contain the chalcogen compound or the carbonaceous material because these materials are high in safety and permit improving the cycle life of the secondary battery.

The carbonaceous material capable of absorbing-releasing lithium ions include, for example, coke, a carbon fiber, a vapor-grown-carbon fiber, graphite, a resin calcined body, a mesophase pitch based carbon fiber, and a mesophase pitch spherical carbon. It is desirable to use these carbonaceous materials because these carbonaceous materials permit increasing the electrode capacity.

The chalcogen compound used in the present invention includes, for example, titanium disulfide, molybdenum disulfide, niobium selenide, and tin oxide. If the negative electrode contains the chalcogen compound noted above, the capacity of the negative electrode is increased, though the battery voltage is lowered, so as to improve the capacity of the secondary battery.

The negative electrode containing the carbonaceous material noted above can be manufactured by, for example, kneading the carbonaceous material and the binder in the presence of a solvent, followed by coating a current collector with the resultant suspension and subsequently drying the coated suspension.

In this case, it is possible to use, for example, polytetrafluoroethylene (PTFE), polyvinylidene fluoride (PVdF), ethylene-propylene-diene copolymer (EPDM) or styrene-butadiene rubber (SBR) as the binder. Also, concerning the mixing ratio of the carbonaceous material and the binder, it is desirable for the carbonaceous material to be used in an amount of 90 to 98% by weight, and for the binder to be used in an amount of 2 to 10% by weight. Also, a conductive substrate made of, for example, aluminum, copper, stainless steel or nickel can be used as the current collector. It is possible for the current collector to be either porous or nonporous.

3) Nonaqueous Electrolyte

The nonaqueous electrolyte used in the present invention includes, for example, a liquid nonaqueous electrolyte prepared by dissolving a solute in a nonaqueous solvent, a polymer gel-like nonaqueous electrolyte in which a nonaqueous solvent and a solute are supported by a polymer material, and a solid nonaqueous electrolyte in which a solute is supported by a polymer material.

The nonaqueous solvent used in the present invention includes, for example, a cyclic carbonate, a straight chain carbonate (such as ethylene carbonate, propylene carbonate, diethyl carbonate, dimethyl carbonate and methyl ethyl carbonate), a cyclic ether and a straight chain ether (such as 1,2-dimethoxy ethane and 2-methyl tetrahydrofuran), and a cyclic ester and a straight chain ester (such as γ-butyrolactone, γ-valerolactone, σ-valerolactone, methyl acetate, ethyl acetate, propyl acetate, isopropyl acetate, methyl propionate, ethyl propionate, and propyl propionate). It is possible to use each of these compounds as a single nonaqueous solvent or to mix two to five kinds of these compounds to prepare a mixed solvent, though the compounds providing the nonaqueous solvent of the present invention are not limited to those exemplified above.

The solute used in the present invention includes, for example, lithium salts such as lithium perchlorate ($LiClO_4$), lithium hexafluoro phosphate ($LiPF_6$), lithium tetrafluoro borate ($LiBF_4$), lithium hexafluoro arsenate ($LiAsF_6$), trifluoromethyl sulfonylimide lithium ($LiCF_3SO_3$), and bistrifluoromethyl sulfonylimide lithium [$LiN(CF_3SO_2)_2$]. It is possible to use a single kind or two or three kinds of these lithium salts as the solute, though the solute used in the present invention is not limited to the lithium salts exemplified above.

It is desirable for the solute to be dissolved in the nonaqueous solvent in an amount falling within a range of between 0.5 and 2 mol/L.

The polymer material contained in the gel-like nonaqueous electrolyte and in the solid nonaqueous electrolyte referred to above includes, for example, polyacrylonitrile, polyacrylate, polyvinylidene fluoride (PVdF), polyethylene oxide (PEO), and a polymer containing acrylonitrile, acrylate, vinylidene fluoride or ethylene oxide as a monomer.

4) Case

The case can be formed of, for example, a metal plate or a sheet having a resin layer. The metal plate can be formed of, for example, iron, stainless steel or aluminum.

It is desirable for the sheet noted above to be formed of a metal layer and a resin layer covering the metal layer. The metal layer should desirably be formed of an aluminum foil. On the other hand, it is possible to use a thermoplastic resin such as polyethylene or polypropylene for forming the resin layer. The resin layer can be of a single layer structure or of a multi-layered structure.

In the nonaqueous electrolyte secondary battery of the present invention, it is possible to arrange a separator between the positive electrode and the negative electrode. It is possible to use, for example, a synthetic resin unwoven fabric, a polyethylene porous film or a polypropylene porous film for forming the separator.

Figure 2:
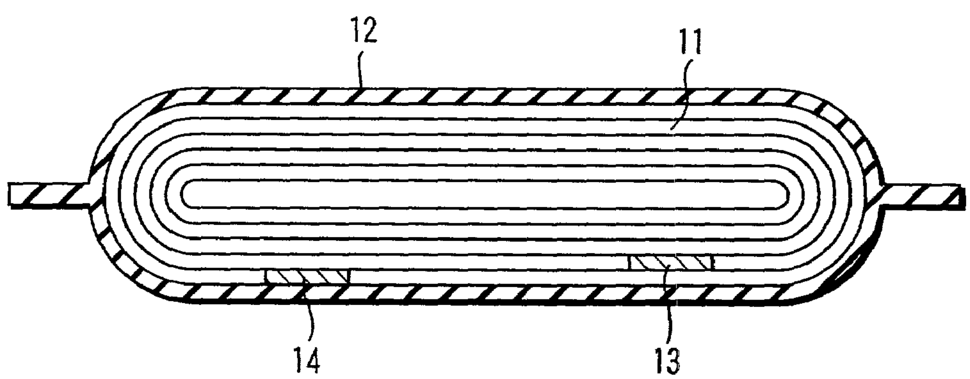
FIG. 2 is a cross sectional view showing a thin type nonaqueous electrolyte secondary battery as an example of a nonaqueous electrolyte secondary battery of the present invention.

FIGS. 1 and 2 exemplify the nonaqueous electrolyte secondary battery of the present invention. Specifically, FIG. 1 is a cross sectional view showing a button type nonaqueous electrolyte secondary battery as an example of the nonaqueous electrolyte secondary battery of the present invention. On the other hand, FIG. 2 is a cross sectional view showing a thin type nonaqueous electrolyte secondary battery as another example of the nonaqueous electrolyte secondary battery of the present invention.

As shown in FIG. 1, a positive electrode 2 and a negative electrode 6 are housed in a cylindrical positive electrode case 1 having a bottom. The positive electrode 2 includes a positive electrode current collector 3 and a positive electrode layer 4 supported on one surface of the positive electrode current collector 3. The positive electrode current collector 3 of the positive electrode 2 is bonded to the inner surface of the positive electrode case 1 by press. A separator 5 is arranged on the positive electrode layer 4 of the positive electrode 2. On the other hand, the negative electrode 6 includes a negative electrode current collector 7 and a negative electrode layer 8 supported on one surface of the negative electrode current collector 7. The negative electrode 6 of the particular construction is arranged on the separator 5. It should be noted that each of the positive electrode 2, the negative electrode 6 and the separator 5 is impregnated with a liquid nonaqueous electrolyte. A cylindrical negative electrode case 9 having a bottom is fixed by caulking to the positive electrode case 1 with an annular insulating gasket 10 interposed therebetween. Incidentally, the negative electrode current collector 7 of the negative electrode 6 is bonded to the inner surface of the negative electrode case 9 by press.

On the other hand, FIG. 2 shows that an electrode group 11 is housed in a bag-like case 12. The electrode group 11 is of a laminate structure comprising a positive electrode, a negative electrode and a separator interposed between the positive electrode and the negative electrode. The electrode group 11 can be prepared by winding flat the laminate structure noted above, followed by applying a thermal pressing to the wound laminate structure. It should be noted that the electrode group 11 is impregnated with a liquid nonaqueous electrolyte. The case 12 housing the electrode group 11 is formed of, for example, a sheet including a resin layer. One end of a band-like positive electrode lead 13 is connected to the positive electrode included in the electrode group 11, and the other end portion of the positive electrode lead 13 extends outward from within the case 12. On the other hand, one end of a band-like negative electrode lead 14 is connected to the negative electrode included in the electrode group 11, and the other end portion of the negative electrode lead 14 extends outward from within the case 12.

In the nonaqueous electrolyte secondary battery shown in FIG. 2, the positive electrode, the negative electrode and the separator are thermally pressed so as to make integral the positive electrode, the negative electrode and the separator. Alternatively, it is also possible to use a polymer material having an adhesivity for making integral the positive electrode, the negative electrode and the separator.

The present invention will now be described more in detail with reference to the following Examples of the present invention.

EXAMPLE 1

Lithium carbonate, magnesium hydroxide, cobalt oxide and ammonium phosphate were weighed and mixed sufficiently at a molar ratio of 1.0:0.55:0.45:1.0 in terms of Li, Mg, Co and P. Then, the mixture was calcined at 350° C. for 20 hours under the air atmosphere, followed by cooling the calcined mixture to room temperature and, then, taking out the cooled mixture. Further, the cooled mixture, which was powdery, was finely pulverized, followed by applying pressure not lower than 1,000 kg/cm$^2$ to the finely pulverized mixture so as to mold the mixture into the form of tablets. Still further, the molded mixture was calcined at 780° C. for 20 hours under the air atmosphere, followed by cooling the calcined mixture to room temperature and subsequently pulverizing finely the cooled mixture so as to obtain a lithium-containing composite metal oxide having a composition represented by $LiMg_{0.55}Co_{0.45}PO_4$.

In the next step, a positive electrode layer was prepared by mixing 80% by weight of the lithium-containing composite metal oxide noted above, which was used as a positive electrode active material, 17% by weight of acetylene black used as an electrical conduction assistant, and 3% by weight of polytetrafluoroethylene used as a binder. A positive electrode was prepared by bonding the positive electrode layer thus prepared to a positive electrode current collector consisting of a stainless steel net.

Also, a negative electrode was prepared by bonding a negative electrode layer formed of lithium metal to a negative electrode current collector formed of a nickel net.

On the other hand, a liquid nonaqueous electrolyte was prepared by mixing ethyl methyl carbonate and ethylene carbonate at a mixing ratio of 2:1, followed by dissolving $LiPF_6$ in the resultant mixture at a rate of 1 mol/L.

Further, a positive electrode case, the positive electrode noted above, a separator formed of a polypropylene porous film, the negative electrode noted above, and a negative electrode case were laminated one upon the other in the order mentioned, followed by pouring the liquid nonaqueous electrolyte noted above into the resultant structure. Then, the open portion was sealed by caulking together with the gasket so as to assemble a button type nonaqueous electrolyte secondary battery constructed as shown in FIG. 1.

EXAMPLES 2 TO 4

A button type nonaqueous electrolyte secondary battery of the construction similar to that described in Example 1 was assembled as in Example 1, except that the composition of the lithium-containing composite metal oxide was changed as shown in Table 1.

COMPARATIVE EXAMPLE 1

Lithium carbonate, cobalt oxide and ammonium phosphate were weighed and sufficiently mixed at a mixing ratio of 1:1:1 in terms of Li, Co and P. Then, the mixture was calcined at 350° C. for 20 hours under the air atmosphere, followed by cooling the calcined mixture to room temperature and, then, taking out the cooled mixture. Further, the cooled mixture, which was powdery, was finely pulverized, followed by applying pressure not lower than 1,000 $kg/cm^2$ to the finely pulverized mixture so as to mold the mixture into the form of tablets. Still further, the molded mixture was calcined at 780° C. for 20 hours under the air atmosphere, followed by cooling the calcined mixture to room temperature and subsequently pulverizing finely the cooled mixture so as to obtain a lithium-containing composite metal oxide having a composition represented by $LiCoPO_4$.

COMPARATIVE EXAMPLE 2

A button type nonaqueous electrolyte secondary battery of the construction similar to that described in Example 1 was assembled as in Example 1, except that the composition of the lithium-containing composite metal oxide was changed as shown in Table 1.

COMPARATIVE EXAMPLE 3

Lithium carbonate, nickel oxide and ammonium phosphate were weighed and sufficiently mixed at a mixing ratio of 1:1:1 in terms of Li, Ni and P. Then, the mixture was calcined at 350° C. for 20 hours under the air atmosphere, followed by cooling the calcined mixture to room temperature and, then, taking out the cooled mixture. Further, the cooled mixture, which was powdery, was finely pulverized, followed by applying pressure not lower than 1,000 $kg/cm^2$ to the finely pulverized mixture so as to mold the mixture into the form of tablets. Still further, the molded mixture was calcined at 780° C. for 20 hours under the air atmosphere, followed by cooling the calcined mixture to room temperature and subsequently pulverizing finely the cooled mixture so as to obtain a lithium-containing composite metal oxide having a composition represented by $LiNiPO_4$.

COMPARATIVE EXAMPLE 4

A button type nonaqueous electrolyte secondary battery of the construction similar to that described in Example 1 was assembled as in Example 1, except that the composition of the lithium-containing composite metal oxide was changed as shown in Table 1.

Each of the secondary batteries prepared in Examples 1 to 4 and Comparative Examples 1 to 4 was charged to 5.3V under a constant current per unit area of the positive electrode of 0.1 $mA/cm^2$, followed by discharging the secondary battery to 3V under a constant current per unit area of the positive electrode of 0.1 $mA/cm^2$ so as to measure the discharge capacity of the secondary battery. Table 1 shows the results as the discharge capacity under discharge at 0.1 $mA/cm^2$ (discharge capacity 1).

Each of the secondary batteries prepared in Examples 1 to 4 and Comparative Examples 1 to 4 was also charged to 5.3V under a constant current per unit area of the positive electrode of 0.2 $mA/cm^2$, followed by discharging the secondary battery to 3V under a constant current per unit area of the positive electrode of 0.2 $mA/cm^2$ so as to measure the discharge capacity of the secondary battery. Table 1 also shows the results as the discharge capacity under discharge at 0.2 $mA/cm^2$ (discharge capacity 2).

Further, the discharge rate characteristics were calculated by formula (A) given below by using the discharge capacity 1 and the discharge capacity 2 thus obtained in respect of each of the secondary batteries prepared in Examples 1 to 4 and Comparative Examples 1 to 4:

$$R(\%)=(C\mathbf{2}/C\mathbf{1})\times 100 \qquad (A)$$

where R represents the discharge rate characteristics (%), C1 represents the discharge capacity under discharge at 0.1 $mA/cm^2$ (discharge capacity 1), and C2 represents the discharge capacity under discharge at 0.2 $mA/cm^2$ (discharge capacity 2).

Table 1 also shows the results.

TABLE 1

| | Composition of first positive electrode active material | Discharge capacity 1 under discharge at 0.1 $mA/cm^2$ (mAh) | Discharge capacity 2 under discharge at 0.2 $mA/cm^2$ (mAh) | Discharge rate characteristics (%) |
|---|---|---|---|---|
| Example 1 | $LiMg_{0.55}Co_{0.45}PO_4$ | 1.28 | 1.15 | 90 |
| Example 2 | $LiMg_{0.55}Ni_{0.45}PO_4$ | 1.27 | 1.16 | 91 |
| Example 3 | $LiMg_{0.7}Co_{0.3}PO_4$ | 0.90 | 0.85 | 94 |
| Example 4 | $LiMg_{0.7}Ni_{0.3}PO_4$ | 0.92 | 0.86 | 93 |
| Comparative Example 1 | $LiCoPO_4$ | 1.44 | 1.12 | 78 |
| Comparative Example 2 | $LiMg_{0.5}Co_{0.5}PO_4$ | 1.31 | 1.05 | 80 |

TABLE 1-continued

| | Composition of first positive electrode active material | Discharge capacity 1 under discharge at 0.1 mA/cm$^2$ (mAh) | Discharge capacity 2 under discharge at 0.2 mA/cm$^2$ (mAh) | Discharge rate characteristics (%) |
|---|---|---|---|---|
| Comparative Example 3 | $LiNiPO_4$ | 1.40 | 0.98 | 76 |
| Comparative Example 4 | $LiMg_{0.5}Ni_{0.5}PO_4$ | 1.28 | 1.05 | 82 |

As apparent from Table 1, the secondary battery for each of Examples 1 to 4, which comprises the positive electrode containing a lithium-containing composite metal oxide having a composition represented by formula (1), i.e., the formula ($LiMg_xM_{1-x}PO_4$), permits suppressing the rate of reduction of the discharge capacity when the discharge current per unit area of the positive electrode is increased, compared with the secondary battery for each of Comparative Examples 1 to 4.

Table 1 also shows that, where the positive electrode active material is formed of the same elements, the discharge rate characteristics of the secondary battery is increased with increase in the molar ratio x of Mg from 0.50 to 0.55 and, further, to 0.7.

EXAMPLE 5

Lithium carbonate, cobalt oxide, magnesium hydroxide, and ammonium phosphate were weighed and mixed sufficiently at a molar ratio of 1.1:0.85:0.05:1.0 in terms of Li, Co, Mg, and P. Then, the mixture was calcined at 350° C. for 20 hours under the air atmosphere, followed by cooling the calcined mixture to room temperature and, then, taking out the cooled mixture. Further, the cooled mixture, which was powdery, was finely pulverized, followed by applying pressure not lower than 1,000 kg/cm$^2$ to the finely pulverized mixture so as to mold the mixture into the form of tablets. Still further, the molded mixture was calcined at 780° C. for 20 hours under the air atmosphere, followed by cooling the calcined mixture to room temperature and subsequently pulverizing finely the cooled mixture so as to obtain a lithium-containing composite metal oxide having a composition represented by $Li_{1.1}Co_{0.85}Mg_{0.05}PO_4$.

A button type nonaqueous electrolyte secondary battery of the construction similar to that described in Example 1 was assembled as in Example 1, except that the lithium-containing composite metal oxide thus prepared was used as the positive electrode active material.

EXAMPLES 6 TO 22

A button type nonaqueous electrolyte secondary battery of the construction similar to that described in Example 1 was assembled as in Example 1, except that the composition of the lithium-containing composite metal oxide was changed as shown in Table 2.

The discharge capacity under discharge at 0.1 mA/cm$^2$ (discharge capacity 1), the discharge capacity under discharge at 0.2 mA/cm$^2$ (discharge capacity 2), and the discharge rate characteristics were measured as in Example 1 in respect of each of the nonaqueous electrolyte secondary batteries prepared in Examples 5 to 22. Table 2 shows the results together with the results for Comparative Examples 1 to 4:

TABLE 2

| | Composition of second positive electrode active material | Dishcarge capacity 1 under discharge at 0.1 mA/cm$^2$ (mAh) | Discharge capacity 2 under discharge at 0.2 mA/cm$^2$ (mAh) | Discharge rate characteristics % |
|---|---|---|---|---|
| Example 5 | $Li_{1.1}Co_{0.85}Mg_{0.05}PO_4$ | 1.55 | 1.31 | 85 |
| Example 6 | $Li_{1.1}Ni_{0.85}Mg_{0.05}PO_4$ | 1.54 | 1.32 | 86 |
| Example 7 | $Li_{1.1}Co_{0.85}Ti_{0.05}PO_4$ | 1.53 | 1.29 | 84 |
| Example 8 | $Li_{1.1}Ni_{0.85}Ti_{0.05}PO_4$ | 1.54 | 1.25 | 81 |
| Example 9 | $Li_{1.1}Co_{0.85}V_{0.05}PO_4$ | 1.60 | 1.28 | 80 |
| Example 10 | $Li_{1.1}Ni_{0.85}V_{0.05}PO_4$ | 1.59 | 1.29 | 81 |
| Example 11 | $Li_{1.1}Co_{0.85}Cr_{0.05}PO_4$ | 1.50 | 1.19 | 79 |
| Example 12 | $Li_{1.1}Ni_{0.85}Cr_{0.05}PO_4$ | 1.49 | 1.19 | 80 |
| Example 13 | $Li_{1.1}Co_{0.85}Mn_{0.05}PO_4$ | 1.55 | 1.29 | 83 |
| Example 14 | $Li_{1.1}Ni_{0.85}Mn_{0.05}PO_4$ | 1.53 | 1.22 | 80 |
| Example 15 | $Li_{1.1}Co_{0.85}Fe_{0.05}PO_4$ | 1.52 | 1.23 | 81 |
| Example 16 | $Li_{1.1}Ni_{0.85}Fe_{0.05}PO_4$ | 1.49 | 1.21 | 81 |
| Example 17 | $Li_{1.1}Co_{0.85}Cu_{0.05}PO_4$ | 1.54 | 1.28 | 83 |
| Example 18 | $Li_{1.1}Ni_{0.85}Cu_{0.05}PO_4$ | 1.51 | 1.22 | 81 |
| Example 19 | $Li_{1.1}Co_{0.85}Zr_{0.05}PO_4$ | 1.57 | 1.33 | 85 |
| Example 20 | $Li_{1.1}Ni_{0.85}Zr_{0.05}PO_4$ | 1.56 | 1.34 | 86 |
| Example 21 | $Li_{1.1}Co_{0.85}Al_{0.05}PO_4$ | 1.55 | 1.26 | 81 |
| Example 22 | $Li_{1.1}Ni_{0.85}Al_{0.05}PO_4$ | 1.55 | 1.24 | 80 |
| Comparative Example 1 | $LiCoPO_4$ | 1.44 | 1.12 | 78 |
| Comparative Example 2 | $LiMg_{0.5}Co_{0.5}PO_4$ | 1.31 | 1.05 | 80 |

TABLE 2-continued

| | Composition of second positive electrode active material | Dishcarge capacity 1 under discharge at 0.1 mA/cm$^2$ (mAh) | Discharge capacity 2 under discharge at 0.2 mA/cm$^2$ (mAh) | Discharge rate characteristics % |
|---|---|---|---|---|
| Comparative Example 3 | $LiNiPO_4$ | 1.40 | 0.98 | 76 |
| Comparative Example 4 | $LiMg_{0.5}Ni_{0.5}PO_4$ | 1.28 | 1.05 | 82 |

As apparent from Table 2, the secondary battery for each of Examples 5 to 22, which comprises the positive electrode containing a lithium-containing composite metal oxide having a composition represented by formula (2), i.e., the formula of ($Li_{1+y}M_{1-y-z}M1_zPO4$), permits increasing the discharge capacity, compared with the secondary battery for each of Comparative Examples 1 to 4.

On the other hand, the discharge capacity and the discharge rate characteristics for each of Comparative Examples 1 and 3 were found to be lower than those for each of Examples 5 to 22. Also, each of Comparative Examples 2 and 4 was substantially equal to Examples 5 to 22 in the discharge rate characteristics of the secondary battery, but was inferior to each of Examples 5 to 22 in the discharge capacity.

EXAMPLE 23

Lithium carbonate, cobalt oxide, magnesium hydroxide, aluminum nitrate and ammonium phosphate were weighed and mixed sufficiently at a molar ratio of 1.0:0.9:0.05:0.1:0.95 in terms of Li, Co, Mg, Al and P. Then, the mixture was calcined at 350° C. for 20 hours under the air atmosphere, followed by cooling the calcined mixture to room temperature and, then, taking out the cooled mixture. Further, the cooled mixture, which was powdery, was finely pulverized, followed by applying pressure not lower than 1,000 kg/cm$^2$ to the finely pulverized mixture so as to mold the mixture into the form of tablets. Still further, the molded mixture was calcined at 780° C. for 20 hours under the air atmosphere, followed by cooling the calcined mixture to room temperature and subsequently pulverizing finely the cooled mixture. The series of operations described above including the molding into the form of tablets, the calcination at 780° C. for 20 hours and the pulverizing of the calcined material were repeated at least twice so as to obtain a lithium-containing composite metal oxide having a composition represented by $LiCo_{0.9}Mg_{0.05}Al_{0.1}P_{0.95}O_4$.

A button type nonaqueous electrolyte secondary battery of the construction similar to that described in Example 1 was assembled as in Example 1, except that the lithium-containing composite metal oxide thus prepared was used as the positive electrode active material.

EXAMPLES 24 TO 64

A button type nonaqueous electrolyte secondary battery of the construction similar to that described in Example 1 was assembled as in Example 1, except that the composition of the lithium-containing composite metal oxide was changed as shown in Tables 3 and 4.

The discharge capacity under discharge at 0.1 mA/cm$^2$ (discharge capacity 1), the discharge capacity under discharge at 0.2 mA/cm$^2$ (discharge capacity 2), and the discharge rate characteristics were measured as in Example 1 in respect of each of the nonaqueous electrolyte secondary batteries prepared in Examples 24 to 64. Tables 3 and 4 also show the results together with the results for Comparative Examples 1 to 4:

TABLE 3

| | Composition of third positive electrode active material | Discharge capacity 1 under discharge at 0.1 mA/cm$^2$ (mAh) | Discharge capacity 2 under discharge at 0.2 mA/cm$^2$ (mAh) | Discharge rate characteristics (%) |
|---|---|---|---|---|
| Example 23 | $LiCo_{0.9}Mg_{0.05}Al_{0.1}P_{0.95}O_4$ | 1.61 | 1.35 | 84 |
| Example 24 | $LiCo_{0.9}Mg_{0.05}Si_{0.1}P_{0.95}O_4$ | 1.61 | 1.38 | 86 |
| Example 25 | $LiCo_{0.9}Mg_{0.05}Ti_{0.1}P_{0.95}O_4$ | 1.59 | 1.37 | 86 |
| Example 26 | $LiCo_{0.9}V_{0.05}Al_{0.1}P_{0.95}O_4$ | 1.55 | 1.29 | 83 |
| Example 27 | $LiCo_{0.9}V_{0.05}Si_{0.1}P_{0.95}O_4$ | 1.56 | 1.33 | 85 |
| Example 28 | $LiCo_{0.9}V_{0.05}Ti_{0.1}P_{0.95}O_4$ | 1.51 | 1.27 | 84 |
| Example 29 | $LiCo_{0.9}Cr_{0.05}Al_{0.1}P_{0.95}O_4$ | 1.60 | 1.28 | 80 |
| Example 30 | $LiCo_{0.9}Cr_{0.05}Si_{0.1}P_{0.95}O_4$ | 1.59 | 1.30 | 82 |
| Example 31 | $LiCo_{0.9}Cr_{0.05}Ti_{0.1}P_{0.95}O_4$ | 1.56 | 1.26 | 81 |
| Example 32 | $LiCo_{0.9}Mn_{0.05}Al_{0.1}P_{0.95}O_4$ | 1.53 | 1.30 | 85 |
| Example 33 | $LiCo_{0.9}Mn_{0.05}Si_{0.1}P_{0.95}O_4$ | 1.50 | 1.23 | 82 |
| Example 34 | $LiCo_{0.9}Mn_{0.05}Ti_{0.1}P_{0.95}O_4$ | 1.51 | 1.24 | 82 |
| Example 35 | $LiCo_{0.9}Fe_{0.05}Al_{0.1}P_{0.95}O_4$ | 1.50 | 1.26 | 84 |
| Example 36 | $LiCo_{0.9}Fe_{0.05}Si_{0.1}P_{0.95}O_4$ | 1.51 | 1.25 | 83 |
| Example 37 | $LiCo_{0.9}Fe_{0.05}Ti_{0.1}P_{0.95}O_4$ | 1.49 | 1.27 | 85 |
| Example 38 | $LiCo_{0.9}Cu_{0.05}Al_{0.1}P_{0.95}O_4$ | 1.53 | 1.22 | 80 |
| Example 39 | $LiCo_{0.9}Cu_{0.05}Si_{0.1}P_{0.95}O_4$ | 1.53 | 1.24 | 81 |
| Example 40 | $LiCo_{0.9}Cu_{0.05}Ti_{0.1}P_{0.95}O_4$ | 1.49 | 1.21 | 81 |
| Example 41 | $LiCo_{0.9}Zr_{0.05}Al_{0.1}P_{0.95}O_4$ | 1.64 | 1.38 | 84 |
| Example 42 | $LiCo_{0.9}Zr_{0.05}Si_{0.1}P_{0.95}O_4$ | 1.65 | 1.39 | 84 |
| Example 43 | $LiCo_{0.9}Zr_{0.05}Ti_{0.1}P_{0.95}O_4$ | 1.63 | 1.39 | 85 |

TABLE 3-continued

| | Composition of third positive electrode active material | Discharge capacity 1 under discharge at 0.1 mA/cm$^2$ (mAh) | Discharge capacity 2 under discharge at 0.2 mA/cm$^2$ (mAh) | Discharge rate characteristics (%) |
|---|---|---|---|---|
| Comparative Example 1 | $LiCoPO_4$ | 1.44 | 1.12 | 78 |
| Comparative Example 2 | $LiMg_{0.5}Co_{0.5}PO_4$ | 1.31 | 1.05 | 80 |

TABLE 4

| | Composition of third positive electrode active material | Discharge capacity 1 under discharge at 0.1 mA/cm$^2$ (mAh) | Discharge capacity 2 under discharge at 0.2 mA/cm$^2$ (mAh) | Discharge rate characteristics (%) |
|---|---|---|---|---|
| Example 44 | $LiNi_{0.9}Mg_{0.05}Al_{0.1}P_{0.95}O_4$ | 1.60 | 1.33 | 83 |
| Example 45 | $LiNi_{0.9}Mg_{0.05}Si_{0.1}P_{0.95}O_4$ | 1.59 | 1.35 | 85 |
| Example 46 | $LiNi_{0.9}Mg_{0.05}Ti_{0.1}P_{0.95}O_4$ | 1.61 | 1.35 | 84 |
| Example 47 | $LiNi_{0.9}V_{0.05}Al_{0.1}P_{0.95}O_4$ | 1.54 | 1.26 | 82 |
| Example 48 | $LiNi_{0.9}V_{0.05}Si_{0.1}P_{0.95}O_4$ | 1.54 | 1.28 | 83 |
| Example 49 | $LiNi_{0.9}V_{0.05}Ti_{0.1}P_{0.95}O_4$ | 1.52 | 1.25 | 82 |
| Example 50 | $LiNi_{0.9}Cr_{0.05}Al_{0.1}P_{0.95}O_4$ | 1.60 | 1.30 | 81 |
| Example 51 | $LiNi_{0.9}Cr_{0.05}Si_{0.1}P_{0.95}O_4$ | 1.61 | 1.29 | 80 |
| Example 52 | $LiNi_{0.9}Cr_{0.05}Ti_{0.1}P_{0.95}O_4$ | 1.55 | 1.27 | 82 |
| Example 53 | $LiNi_{0.9}Mn_{0.05}Al_{0.1}P_{0.95}O_4$ | 1.51 | 1.27 | 84 |
| Example 54 | $LiNi_{0.9}Mn_{0.05}Si_{0.1}P_{0.95}O_4$ | 1.49 | 1.19 | 80 |
| Example 55 | $LiNi_{0.9}Mn_{0.05}Ti_{0.1}P_{0.95}O_4$ | 1.51 | 1.22 | 81 |
| Example 56 | $LiNi_{0.9}Fe_{0.05}Al_{0.1}P_{0.95}O_4$ | 1.48 | 1.26 | 85 |
| Example 57 | $LiNi_{0.9}Fe_{0.05}Si_{0.1}P_{0.95}O_4$ | 1.50 | 1.25 | 83 |
| Example 58 | $LiNi_{0.9}Fe_{0.05}Ti_{0.1}P_{0.95}O_4$ | 1.59 | 1.34 | 84 |
| Example 59 | $LiNi_{0.9}Cu_{0.05}Al_{0.1}P_{0.95}O_4$ | 1.52 | 1.22 | 80 |
| Example 60 | $LiNi_{0.9}Cu_{0.05}Si_{0.1}P_{0.95}O_4$ | 1.51 | 1.19 | 79 |
| Example 61 | $LiNi_{0.9}Cu_{0.05}Ti_{0.1}P_{0.95}O_4$ | 1.49 | 1.21 | 81 |
| Example 62 | $LiNi_{0.9}Zr_{0.05}Al_{0.1}P_{0.95}O_4$ | 1.63 | 1.35 | 83 |
| Example 63 | $LiNi_{0.9}Zr_{0.05}Si_{0.1}P_{0.95}O_4$ | 1.63 | 1.39 | 85 |
| Example 64 | $LiNi_{0.9}Zr_{0.05}Ti_{0.1}P_{0.95}O_4$ | 1.60 | 1.34 | 84 |
| Comparative Example 3 | $LiNiPO_4$ | 1.40 | 0.98 | 76 |
| Comparative Example 4 | $LiMg_{0.5}Ni_{0.5}PO_4$ | 1.28 | 1.05 | 82 |

As apparent from Table 3, the secondary battery for each of Examples 23 to 43, which comprises the positive electrode containing a lithium-containing composite metal oxide having a composition represented by formula (3), i.e., the formula of ($LiCo_v\mathbf{M2}_w\mathbf{M3}_sP_tO_4$), permits increasing the discharge capacity, compared with the secondary battery for each of Comparative Examples 1 and 2.

On the other hand, the discharge capacity and the discharge rate characteristics of the secondary battery for Comparative Example 1 were lower than those for each of Examples 23 to 43. Also, Comparative Example 2 was substantially equal to each of Examples 23 to 43 in the discharge rate characteristics, but was inferior to each of Examples 23 to 43 in the discharge capacity.

As apparent from Table 4, the secondary battery for each of Examples 44 to 64, which comprises the positive electrode containing a lithium-containing composite metal oxide having a composition represented by formula (3), i.e., the formula of ($LiNi_v\mathbf{M2}_w\mathbf{M3}_sP_tO_4$), permits increasing the discharge capacity, compared with the secondary battery for each of Comparative Examples 3 and 4.

On the other hand, the discharge capacity and the discharge rate characteristics of the secondary battery for Comparative Example 3 were lower than those for each of Examples 44 to 64. Also, Comparative Example 4 was substantially equal to each of Examples 44 to 64 in the discharge rate characteristics, but was inferior to each of Examples 44 to 64 in the discharge capacity.

<Relationship between Molar Ratio of Li and Discharge Rate Characteristics>

EXAMPLES 65 TO 68

A button type nonaqueous electrolyte secondary battery of the construction similar to that described in Example 5 was assembled as in Example 5, except that the composition of the lithium-containing composite metal oxide was changed as shown in Table 5.

The discharge capacity under discharge at 0.1 mA/cm$^2$ (discharge capacity 1), the discharge capacity under discharge at 0.2 mA/cm$^2$ (discharge capacity 2), and the discharge rate characteristics were measured as in Example 1 in respect of each of the nonaqueous electrolyte secondary batteries prepared in Examples 65 to 68. Table 5 also shows the results:

TABLE 5

| | Composition of second positive electrode active material | Discharge capacity 1 under discharge at 0.1 mA/cm$^2$ (mAh) | Discharge capacity 2 under discharge at 0.2 mA/cm$^2$ (mAh) | Discharge rate characteristics (%) |
|---|---|---|---|---|
| Example 5 | $Li_{1.1}Co_{0.85}Mg_{0.05}PO_4$ | 1.55 | 1.31 | 85 |
| Example 65 | $Li_{1.01}Co_{0.94}Mg_{0.05}PO_4$ | 1.48 | 1.18 | 80 |
| Example 66 | $Li_{1.02}Co_{0.93}Mg_{0.05}PO_4$ | 1.56 | 1.29 | 83 |
| Example 67 | $Li_{1.2}Co_{0.75}Mg_{0.05}PO_4$ | 1.50 | 1.25 | 83 |
| Example 68 | $Li_{1.25}Co_{0.7}Mg_{0.05}PO_4$ | 1.40 | 1.13 | 81 |

To reiterate, the secondary battery for each of Examples 5 and 65 to 68 comprises a positive electrode containing a lithium-containing composite metal oxide having a composition represented by formula (2), i.e., the formula of $Li_{1+y}M_{1-y-z}\mathbf{M1}_zPO_4$. As apparent from Table 5, the discharge rate characteristics of the secondary battery for each of Examples 5, 66 and 67, in which the molar ratio y in formula (2) noted above fell within a range of between 0.02 and 0.2, were found to be higher than those for each of Examples 65 and 68. Particularly, the secondary battery for Example 5, in which the molar ratio y fell within a range of between 0.04 and 0.1, was found to be most excellent in the discharge rate characteristics.

<Relationship between Molar Ratios of Elements M2, M3 and Discharge Rate Characteristics>

EXAMPLES 69 TO 75

A button type nonaqueous electrolyte secondary battery of the construction similar to that described in Example 23 was assembled as in Example 23, except that the composition of the lithium-containing composite metal oxide was changed as shown in Table 6.

The discharge capacity under discharge at 0.1 mA/cm$^2$ (discharge capacity 1), the discharge capacity under discharge at 0.2 mA/cm$^2$ (discharge capacity 2), and the discharge rate characteristics were measured as in Example 1 in respect of each of the nonaqueous electrolyte secondary batteries prepared in Examples 69 to 75. Table 6 also shows the results together with the results for Example 23:

TABLE 6

| | Composition of third positive electrode active material | Discharge capacity 1 under discharge at 0.1 mA/cm$^2$ (mAh) | Discharge capacity 2 under discharge at 0.2 mA/cm$^2$ (mAh) | Discharge rate characteristics (%) |
|---|---|---|---|---|
| Example 23 | $LiCo_{0.9}Mg_{0.05}Al_{0.1}P_{0.95}O_4$ | 1.61 | 1.35 | 84 |
| Example 69 | $LiCo_{0.94}Mg_{0.01}Al_{0.1}P_{0.95}O_4$ | 1.58 | 1.28 | 81 |
| Example 70 | $LiCo_{0.93}Mg_{0.02}Al_{0.1}P_{0.95}O_4$ | 1.56 | 1.29 | 83 |
| Example 71 | $LiCo_{0.65}Mg_{0.3}Al_{0.1}P_{0.95}O_4$ | 1.35 | 1.13 | 84 |
| Example 72 | $LiCo_{0.95}Mg_{0.05}Al_{0.01}P_{0.99}O_4$ | 1.58 | 1.30 | 82 |
| Example 73 | $LiCo_{0.94}Mg_{0.05}Al_{0.02}P_{0.98}O_4$ | 1.58 | 1.34 | 85 |
| Example 74 | $LiCo_{0.92}Mg_{0.05}Al_{0.06}P_{0.97}O_4$ | 1.61 | 1.42 | 88 |
| Example 75 | $LiCo_{0.89}Mg_{0.05}Al_{0.12}P_{0.94}O_4$ | 1.60 | 1.31 | 82 |

To reiterate, the secondary battery for each of Examples 23 and 69 to 75 comprises a positive electrode containing a lithium-containing composite metal oxide having a composition represented by formula (3) given previously, i.e., the composition of $LiM_v\mathbf{M2}_w\mathbf{M3}_sP_tO_4$. As apparent from Table 6, the discharge rate characteristics of the secondary battery for each of Examples 23, 70 and 71, in which the molar ratio w of the element M2 fell within a range of between 0.02 and 0.3, were found to be higher than those for Example 69. Particularly, the secondary battery for Example 23, in which the molar ratio w of the element M2 fell within a range of between 0.04 and 0.2, was found to be excellent in the discharge rate characteristics and also found to be superior to the secondary battery for each of Examples 69 to 71 in the discharge capacity.

Also, the secondary battery for each of Examples 23, 73 and 74, in which the molar ratio s of the element M3 fell within a range of between 0.02 and 0.2, was found to exhibit the discharge rate characteristics higher than those exhibited by the secondary battery for each Examples 72 and 75. Particularly, the secondary battery for each of Examples 73 and 74, in which the molar ratio s of the element M3 fell within a range of between 0.02 and 0.08, was found to be most excellent in the discharge rate characteristics.

(Comparative Experiment between Second Positive Electrode Active Material and Third Positive Electrode Active Material)

Each of the nonaqueous electrolyte secondary batteries for Examples 5, 7, 21 comprising the second positive electrode active material, for Examples 23 to 25 comprising the third positive electrode active material and for Comparative Examples 1 and 2 was subjected to a charge-discharge cycle test, in which the secondary battery was charged to 5.3V under a constant current of 0.1 mA/cm$^2$, followed by discharging the secondary battery to 3V under a constant current of 0.1 mA/cm$^2$, so as to measure the number of charge-discharge cycles at the time when the discharge capacity of the secondary battery was lowered to 80% or less of the initial capacity. Table 7 shows the results.

TABLE 7

| | Composition of positive electrode active material | Discharge capacity 1 under discharge at 0.1 mA/cm$^2$ (mAh) | Discharge capacity 2 under discharge at 0.2 mA/cm$^2$ (mAh) | Discharge rate character-istics (%) | Charge-discharge cycle life |
|---|---|---|---|---|---|
| Example 5 | $Li_{1.1}Co_{0.85}Mg_{0.05}PO_4$ | 1.55 | 1.31 | 85 | 12 |
| Example 7 | $Li_{1.1}Co_{0.85}Ti_{0.05}PO_4$ | 1.53 | 1.29 | 84 | 10 |
| Example 21 | $Li_{1.1}Co_{0.85}Al_{0.05}PO_4$ | 1.55 | 1.26 | 81 | 13 |
| Example 23 | $LiCo_{0.9}Mg_{0.05}Al_{0.1}P_{0.95}O_4$ | 1.61 | 1.35 | 84 | 20 |
| Example 24 | $LiCo_{0.9}Mg_{0.05}Si_{0.1}P_{0.95}O_4$ | 1.61 | 1.38 | 86 | 18 |
| Example 25 | $LiCo_{0.9}Mg_{0.05}Ti_{0.1}P_{0.95}O_4$ | 1.59 | 1.37 | 86 | 18 |
| Comparative Example 1 | $LiCoPO_4$ | 1.44 | 1.12 | 78 | 3 |
| Comparatvie Example 2 | $LiMg_{0.5}Co_{0.5}PO_4$ | 1.31 | 1.05 | 80 | 6 |

As apparent from Table 7, the secondary batteries for Examples 23 to 25 comprising the lithium-containing composite metal oxide having a composition represented by formula (3), i.e., the formula of ($LiM_v\mathbf{M2}_w\mathbf{M3}_sP_tO_4$), were found to be superior in the charge-discharge cycle life to the secondary batteries for Examples 5, 7, 21 comprising the lithium-containing composite metal oxide having a composition represented by formula (2), i.e., the formula of ($Li_{1+y}M_{1-y-z}\mathbf{M1}_zPO_4$), <Thin Type Nonaqueous Electrolyte Secondary Battery>

EXAMPLE 76

<Preparation of Positive Electrode>

Acetylene black in an amount of 2.5% by weight, graphite in an amount of 3% by weight, polyvinylidene fluoride (PVdF) in an amount of 4% by weight and an N-methyl pyrrolidone (NMP) solution were mixed with 91% by weight of a lithium-containing composite metal oxide powder having a composition similar to that described previously in conjunction with Example 1. Then, a current collector formed of an aluminum foil having a thickness of 15 μm was coated with the mixture, followed by drying and, then, pressing the coating so as to prepare a positive electrode having an electrode density of 3.0 g/cm$^3$.

<Preparation of Negative Electrode>

An N-methyl pyrrolidone (NMP) solution was added to a mixture consisting of 94% by weight of mesophase pitch based carbon fiber subjected to a heat treatment at 3,000° C., said carbon fiber having an average particle diameter of 25 μm and an average fiber length of 30 μm, and 6% by weight of polyvinylidene fluoride (PVdF). Then, a copper foil having a thickness of 12 μm was coated with the mixture, followed by drying and, then, pressing the coating so as to prepare a negative electrode having an electrode density of 1.4 g/cm$^3$.

<Preparation of Electrode Group>

The positive electrode noted above, a separator formed of a polyethylene porous film having a porosity of 50% and an air permeability of 200 seconds/100 cm$^3$, the negative electrode noted above, and the separator noted above were laminated one upon the other in the order mentioned, followed by spirally winding the resultant laminate structure. The wound laminate structure was subjected to a thermal pressing at 90° C. so as to obtain a flat electrode group having a width of 30 mm and a thickness of 3.0 mm. The electrode group thus prepared was housed in a laminate film bag formed of a laminate film having a thickness of 0.1 mm and consisting essentially of an aluminum foil having a thickness of 40 μm and polypropylene layers formed on both surfaces of the aluminum foil. The electrode group housed in the laminate film bag was subjected to a vacuum drying at 80° C. for 24 hours.

<Preparation of Liquid Nonaqueous Electrolyte>

A liquid nonaqueous electrolyte was prepared by dissolving lithium tetrafluoroborate ($LiBF_4$) used as a solute in a mixed solvent consisting of ethylene carbonate (EC), γ-butyrolactone (BL) and vinylene carbonate (VC), which were mixed at a mixing ratio by volume of 24:75:1, in an amount of 1.5 mol/L.

The liquid nonaqueous electrolyte thus prepared was poured into the laminate film bag having the electrode group housed therein, followed by completely sealing the laminate film bag by means of heat seal so as to prepare a thin type nonaqueous electrolyte secondary battery constructed as shown in FIG. 2 and having a width of 35 mm, a thickness of 3.2 mm and a height of 65 mm.

EXAMPLE 77

A thin lithium ion secondary battery was prepared as in Example 76, except that a lithium-containing composite metal oxide having a composition equal to that for Example 5 was used as a positive electrode active material.

EXAMPLE 78

A thin lithium ion secondary battery was prepared as in Example 76, except that a lithium-containing composite metal oxide having a composition equal to that for Example 23 was used as a positive electrode active material.

Comparative Example 7

A thin lithium ion secondary battery was prepared as in Example 76, except that a lithium-containing composite metal oxide having a composition equal to that for Comparative Example 2 was used as a positive electrode active material.

<Large Current Discharge Characteristics (Discharge Rate Characteristics)>

The secondary battery for each of Examples 76 to 78 and Comparative Example 7 was charged to 5.3V under a constant current per unit area of the positive electrode of 0.1 mA/cm$^2$, followed by discharging the secondary battery to 3V under a constant current per unit area of the positive electrode of 0.1 mA/cm$^2$ so as to measure the discharge capacity 1. The secondary battery for each of Examples 76 to 78 and Comparative Example 7 was charged to 5.3V under a constant current per unit area of the positive electrode of 0.2 $mA/cm^2$, followed by discharging the secondary battery to 3V under a constant current per unit area of the positive electrode of 0.2 $mA/cm^2$ so as to measure the discharge capacity 2.

Further, the discharge rate characteristics were calculated by aforementioned formula (A) by using the discharge capacity 1 and the discharge capacity 2 thus obtained in respect of each of the secondary batteries prepared in Examples 76 to 78 and Comparative Example 7. Table 8 shows the rate (%) thus measured as the large current discharge characteristics (discharge rate characteristics). Incidentally, the discharge rate characteristics of the other secondary batteries are given in Table 8 on the basis that the discharge rate characteristics of the secondary battery for Example 76 was set at 100%:

TABLE 8

| | Composition of positive electrode active material | Discharge rate characteristics (%) |
|---|---|---|
| Example 76 | $LiMg_{0.55}Co_{0.45}PO_4$ (Example 1) | 100 |
| Example 77 | $Li_{1.1}Co_{0.85}Mg_{0.05}PO_4$ (Example 5) | 95 |
| Example 78 | $LiCo_{0.9}Mg_{0.05}Al_{0.1}P_{0.95}O_4$ (Example 23) | 95 |
| Comparative Example 7 | $LiMg_{0.5}Co_{0.5}PO_4$ (Comparative Example 2) | 85 |

As apparent from Table 8, the thin type nonaqueous electrolyte secondary batteries for Examples 76 to 78 containing lithium-containing composite metal oxides having compositions represented by formulas (1) to (3) were found to be superior to the secondary battery for Comparative Example 7 in the discharge rate characteristics.

The Examples described above are directed to button type nonaqueous electrolyte secondary batteries and thin type nonaqueous electrolyte secondary batteries. However, the present invention is not limited to the button type nonaqueous electrolyte secondary battery and the thin type nonaqueous electrolyte secondary battery. For example, the present invention can also be applied to a rectangular or cylindrical nonaqueous electrolyte secondary battery.

As apparent from the Examples described above, the present invention permits improving the discharge capacity and the discharge rate characteristics of the nonaqueous electrolyte secondary battery comprising a 5V class positive electrode active material of $LiMPO_4$, where M represents at least one kind of an element selected from the group consisting of Ni and Co. It follows that the present invention permits further improving the energy density of the nonaqueous electrolyte secondary battery that has been put to the practical use nowadays such as a lithium ion secondary battery.

As described above in detail, the present invention provides a positive electrode active material capable of improving the discharge capacity and the discharge rate characteristics, and a nonaqueous electrolyte secondary battery comprising the particular positive electrode active material.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising:

a positive electrode containing a positive electrode active material comprising a lithium-comprising composite metal oxide;

a negative electrode; and a nonaqueous electrolyte;

wherein said lithium-comprising composite metal oxide has a composition represented by formula (2) given below:

$$Li_{1+y}M_{1-y-z}M1_zPO_4 \quad (2)$$

where M is at least one kind of an element selected from the group consisting of Co and Ni,

M1 is at least one kind of an element selected from the group consisting of Mg, Zr and Al, the part of the Li that is represented as the molar ratio y replace a part of the M, the M1 that is represented as the molar ratio z replaces a part of the M, y is larger than 0 and smaller than 0.5, and z is larger than 0 and not larger than 0.5.

2. The nonaqueous electrolyte secondary battery according to claim 1, wherein y is between 0.02 and 0.2.

3. The nonaqueous electrolyte secondary battery according to claim 1, wherein z is between 0.02 and 0.3.

4. A positive electrode active material comprising a lithium-comprising composite metal oxide having a composition represented by formula (2) given below:

$$Li_{1+y}M_{1-y-z}M1_zPO_4 \quad (2)$$

where M is at least one kind of an element selected from the group consisting of Co and Ni, where M1 is at least one kind of an element selected from the group consisting of Mg, Zr and Al, the part of the Li that is represented as the molar ratio y replace a part of the M, the M1 that is represented as the molar ratio z replaces a part of the M, y is larger than 0 and smaller than 0.5, and z is larger than 0 and not larger than 0.5.

5. The positive electrode active material according to claim 4, wherein y is between 0.02 and 0.2.

6. The positive electrode active material according to claim 4, wherein z is between 0.02 and 0.3.

7. The nonaqueous electrolyte secondary battery according to claim 1, wherein M1 is Mg.

8. The nonaqueous electrolyte secondary battery according to claim 1, wherein M1 is Zr.

9. The nonaqueous electrolyte secondary battery according to claim 1, wherein M1 is Al.

10. The positive electrode active material according to claim 4, wherein M1 is Mg.

11. The positive electrode active material according to claim 4, wherein M1 is Zr.

12. The positive electrode active material according to claim 4, wherein M1 is Al.

13. The nonaqueous electrolyte secondary battery according to claim 1, wherein y is larger than 0 and not larger than 0.25.

14. The nonaqueous electrolyte secondary battery according to claim 13, wherein y is larger than 0.01 and not larger than 0.25.

15. The nonaqueous electrolyte secondary battery according to claim 13, wherein M is Co; and M1 is Mg or Zr.

16. The nonaqueous electrolyte secondary battery according to claim 13, wherein M is Co; and M1 is Mg.

17. The positive electrode active material according to claim 4, wherein y is larger than 0 and not larger than 0.25.

18. The positive electrode active material according to claim 17, wherein y is larger than 0.01 and not larger than 0.25.

19. The positive electrode active material according to claim 17, wherein M is Co; and M1 is Mg or Zr.

20. The positive electrode active material according to claim 17, wherein M is Co; and M1 is Mg.

* * * * *